(12) United States Patent
Dobrot et al.

(10) Patent No.: US 9,073,412 B2
(45) Date of Patent: Jul. 7, 2015

(54) UTILITY VEHICLE OCCUPANT SIDE RETENTION SYSTEM

(71) Applicant: Deere & Company, Moline, IL (US)

(72) Inventors: Steven P. Dobrot, Sun Prairie, WI (US); Nathan Yolitz, Mayville, WI (US)

(73) Assignee: DEERE & COMPANY, Moline, IL (US)

( * ) Notice: Subject to any disclaimer, the term of this patent is extended or adjusted under 35 U.S.C. 154(b) by 94 days.

(21) Appl. No.: 13/861,835

(22) Filed: Apr. 12, 2013

(65) Prior Publication Data

US 2014/0306487 A1    Oct. 16, 2014

(51) Int. Cl.
*B60R 21/06* (2006.01)
*B60J 5/04* (2006.01)

(52) U.S. Cl.
CPC .................... *B60J 5/0487* (2013.01)

(58) Field of Classification Search
USPC ............. 280/748, 749, 751, 753; 296/190.03, 296/152
See application file for complete search history.

(56) References Cited

U.S. PATENT DOCUMENTS

| | | | | |
|---|---|---|---|---|
| 5,588,672 A | * | 12/1996 | Karlow et al. | 280/730.2 |
| 5,857,701 A | * | 1/1999 | Nanda | 280/749 |
| 6,000,715 A | * | 12/1999 | Tschaeschke | 280/730.2 |
| 6,502,859 B1 | | 1/2003 | Svetlik | |
| 6,773,054 B2 | * | 8/2004 | Martini | 296/148 |
| 7,036,869 B1 | * | 5/2006 | Stipanovich | 296/152 |
| 7,125,069 B2 | * | 10/2006 | Cacucci et al. | 296/190.03 |
| 7,556,291 B2 | * | 7/2009 | Gale et al. | 280/749 |
| 8,123,279 B2 | * | 2/2012 | Orr et al. | 296/148 |
| 8,251,400 B2 | | 8/2012 | Davis et al. | |
| 8,292,352 B2 | | 10/2012 | Furman et al. | |
| 8,308,223 B2 | * | 11/2012 | King | 296/190.03 |
| 8,328,235 B2 | | 12/2012 | Schneider et al. | |
| 8,696,006 B2 | * | 4/2014 | Sanschagrin et al. | 280/256 |
| 8,714,591 B1 | * | 5/2014 | Kobayashi et al. | 280/749 |
| 2001/0033084 A1 | * | 10/2001 | Murray et al. | 296/24.1 |
| 2007/0018442 A1 | * | 1/2007 | Kwok | 280/749 |

* cited by examiner

*Primary Examiner* — Toan To

(57) ABSTRACT

A utility vehicle occupant side retention system includes a net assembly having a lower edge sliding along a guiderail secured to the utility vehicle. A rear edge of the net assembly may be attached to at least one rear attachment point on a roll over protection structure of the utility vehicle, and a front edge may be releasably attached to a front attachment point on the roll over protection structure. The guiderail may be sloped sufficiently to a vertical peak so the front edge of the net assembly may be releasably attached to the front attachment point on the rollover protection structure only if a part of the lower edge slides forwardly and upwardly to a forward end of the guiderail.

19 Claims, 3 Drawing Sheets

UTILITY VEHICLE OCCUPANT SIDE RETENTION SYSTEM

FIELD OF THE INVENTION

This invention relates to off-road and recreational utility vehicles, and more specifically to utility vehicle occupant side retention systems.

BACKGROUND OF THE INVENTION

Utility vehicles for off-road and recreational use are capable of carrying a seated driver and one or more seated passengers. These utility vehicles may include one or two rows of seats, and roll over protection structures extending over the seating areas. Additionally, they may require occupant side retention devices to reduce the probability of entrapment of a properly belted occupant's head, upper torso and limbs in the event of a tip-over onto the vehicle's side.

Some occupant side retention systems on these utility vehicles include nets with fixed frame attachment points and one or more buckles or latches. The attachment points and buckles or latches may be difficult to use and the nets may be cumbersome to handle, and the nets may collapse in the seating area or drag on the ground when they are unbuckled.

Other occupant side retention systems include half doors with nets extending above the doors, as shown in U.S. Pat. No. 8,292,352. However, these systems require drivers and passengers to open the doors to enter or exit the vehicle. Still other occupant side retention systems include nets attached to pivotal bars, as shown in U.S. Pat. No. 8,328,235. The pivotal bars and pivot links add to the cost of these systems.

A utility vehicle occupant side retention system is needed that is easy to use and handle, having minimal impact on ingress and egress into the vehicle, and is low in cost.

SUMMARY OF THE INVENTION

A utility vehicle occupant side retention system includes a guiderail fastened rigidly to a side of the utility vehicle with an upwardly sloping ramp toward a forward end of the guiderail. A net assembly has a lower edge that is slideably engaged to the guiderail, a rear edge fastened to at least one rear attachment point on the utility vehicle, and a front edge releasably fastened to a front attachment point on the utility vehicle. The front edge may be releasably fastened to a single front attachment point only if part of the lower edge of the net assembly is at a forward end of the guiderail. The utility vehicle occupant side retention system is easy to use and handle, with minimal impact on ingress and egress into the vehicle, and is low in cost.

DESCRIPTION OF THE PREFERRED EMBODIMENT

Figure 1:
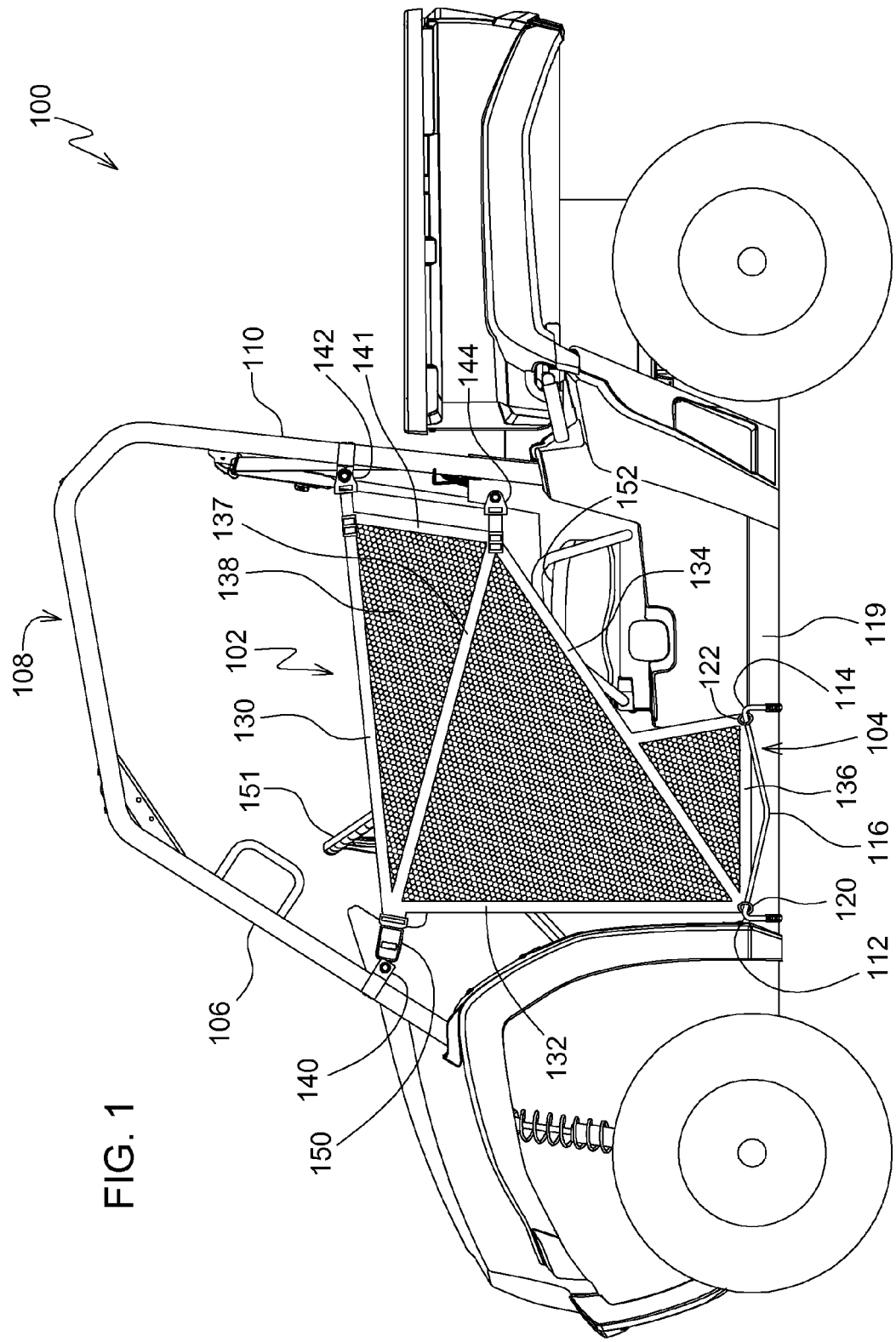
FIG. 1 is a side view of a utility vehicle occupant side retention system in a buckled position according to a first embodiment of the invention.
Figure 2:
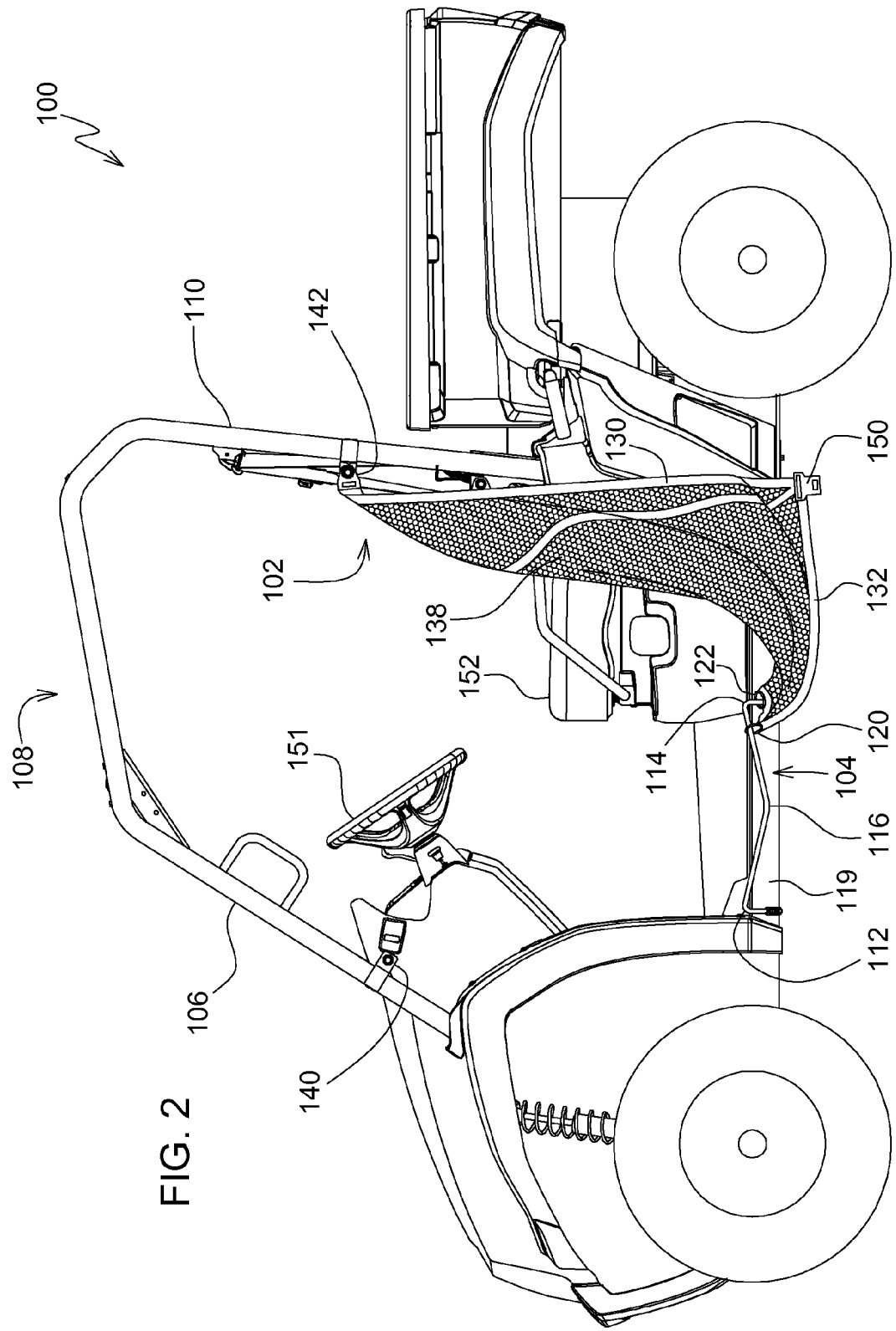
FIG. 2 is a side view of a utility vehicle occupant side retention system in an unbuckled position according to a first embodiment of the invention.
Figure 3:
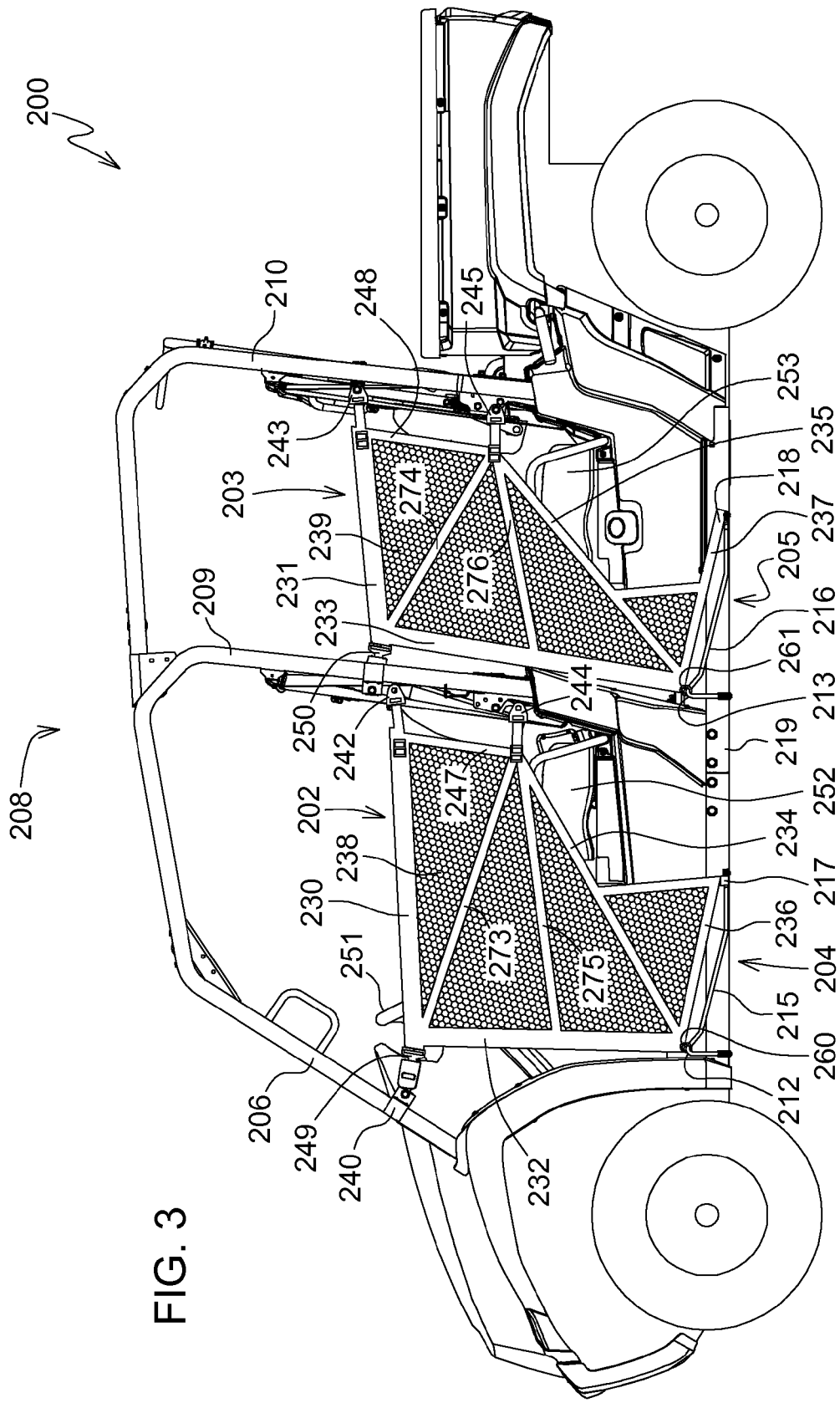
FIG. 3 is a side view of a utility vehicle occupant side retention system in a buckled position according to a second embodiment of the invention.

In one embodiment shown in FIGS. 1 and 2, utility vehicle 100 may include occupant side retention system 102 having net assembly 138 with a lower edge 136 that slides fore and aft, and vertically, along guiderail 104 between an open position and a closed position. The lower edge of the net assembly may slide forwardly and vertically to the front end of the guiderail, allowing the net assembly to be bucked or latched in the closed position at a single releasable attachment point 140. The occupant side retention system may be provided on either or both of the left and right sides of a utility vehicle, to protect the driver and passenger. Additionally, as shown in FIG. 3, the occupant side retention system may be provided adjacent the front seating area and rear seating area of a utility vehicle having two rows of seats.

In a first embodiment, occupant side retention system 102 may include guiderail 104 fastened rigidly to the side or outer edge of lower frame member 119 at or adjacent the floor of the utility vehicle's seating area, and generally forwardly of vehicle seat 152. The guiderail may be steel, aluminum or another metal or alloy, or high strength plastic material. In the embodiment shown, the guiderail has a diameter of less than about 2 cm, and a length of less than about 1 meter. In the embodiment of FIGS. 1 and 2, the guiderail may have a forward end fastened rigidly to the lower frame member adjacent the front of the seating area, and a rearward end fastened rigidly to the lower frame member adjacent the front of vehicle seat 152. The forward end 112 of the guiderail may have a vertical peak where part of the lower edge of the net assembly slides to in the closed position. The vertical peak may be at least about 2 cm vertically higher than lower portions of the guiderail, including the guiderail's center 116. Optionally, the rearward end 114 of the guiderail also may have a vertical peak at least about 2 cm vertically higher than lower portions of the guiderail, including the guiderail's center. The guiderail in FIGS. 1 and 2 is shown having a slope or ramp that is symmetrical on each side of its center 116, but the slope or ramp can start at any point along the guiderail instead of the center, or at any location within the fore-and-aft dimension of the seating area.

In one embodiment, occupant side retention system 102 may include net assembly 138 having lower edge 136, and at least part of the lower edge slides fore and aft, and to the vertical peak, along guiderail 104. The lower edge of the net assembly may slide along the guiderail by various retaining and sliding mechanisms. For example, the net assembly may have one or more rings, such as forward ring 120 and rearward ring 122, attached to the lower edge of the net assembly and having a larger diameter than the guiderail. The forward ring may be secured to the front lower corner of the net assembly, and the rearward ring may be secured to the rear lower corner of the net assembly. Alternatively, the rear lower corner of the net assembly may be fixed and secured in place to rearward end 114 of the guiderail. The net assembly's lower or bottom edge 136 may have substantially the same length as the dimension between forward end 112 and rearward end 114 of the guiderail. The operator may close the net assembly by sliding it forwardly, urging lower or bottom edge 136 forwardly until part of the lower bottom edge, and preferably the front lower corner, reaches forward end 112 of the guiderail. The lower edge of the net assembly may reach substantially its full length, and part of the lower edge, and preferably the rear lower corner may be at rearward end 114 of the guiderail. Other components or mechanism may be used to slide the net assembly along the guiderail, such as followers that engage slots in the guiderail instead of rings, if the components allow the lower or bottom edge of the net assembly to slide freely along the guiderail and follow the guiderail profile.

In one embodiment, rear edge 141 of net assembly 138 may be fastened to roll over protection structure 108 of utility vehicle 100 at one or more rear attachment points 142, 144. The rear attachment points for the rear edge of the net assembly may include a pair of clamps fastened to rear upright 110 of the roll over protection structure adjacent seat 152. One of the rear attachment points, for the top rear corner of the net assembly, may be located on roll over protection structure upright 110 at or above the top of the seat back. Alternatively, one or more of the rear attachment points may be fastened to other structures on the utility vehicle adjacent the seat and seat back.

In one embodiment, front edge 132 of net assembly 138 may be removably and releasably buckled or latched to front upright 106 of the roll over protection structure at single front attachment point 140. The single front attachment point for the front edge of the net assembly may be a clamp fastened to front upright 106 of the roll over protection structure, adjacent the dashboard of the utility vehicle. The net assembly may include a buckle or latch 150 that an operator can manually release, engage and disengage from front attachment point 140. The single front attachment point may be used to open and close the occupant side retention system by buckling or latching the front edge of the net assembly to the roll over protection structure forwardly of steering wheel 151. Alternatively, the single front attachment point may be used to releasably and removably buckle or latch a part of the front edge of the net assembly to another structure of the utility vehicle adjacent the front of the seating area.

In one embodiment, the net assembly's front edge 132 may have substantially the same length as the dimension between forward end 112 of the guiderail and front attachment point 140. Front edge 132 of the net assembly may be pulled to substantially its full length when forward ring 120 reaches the vertical peak at forward end 112 of the guiderail, so that buckle 150 can be engaged to clamp 140. Additionally, the net assembly's top edge 130 may have substantially the same length as the dimension between rear attachment point 142 and front attachment point 140. Top edge 130 of the net assembly also may be pulled to its full length so that buckle or latch 150 can be engaged to clamp 140. Additionally, the net assembly may have diagonal 134 between the edges, dimensioned to fit between rear attachment point 144 and forward end 112 of the guiderail, and diagonal 137 between the edges, dimensioned to fit between rear attachment point 144 and front attachment point 140. The diagonals may be pulled to their full length when buckle 150 is engaged to clamp 140. The edges of the net assembly and diagonals also may be reinforced with high strength material or high tension straps. Additionally, one or more of the edges and/or straps may include adjustment members that may be used to adjust their lengths.

In one embodiment, an operator may move occupant side retention system 102 from the open position of FIG. 2 to the closed position of FIG. 1, by urging net assembly 138 in a forward direction, causing bottom or lower edge 136 of the net assembly to follow guiderail 104 forwardly and up the vertical peak at the forward end sufficiently so the operator can lock buckle or latch 150 to top front attachment point 140. In the closed position, the net assembly may cover the occupant opening alongside the seating area, limiting the occupant's feet, arms and torso to within an offset plane of the vehicle. To prevent the bottom or lower edge of the net from opening unintentionally from the outside or inside of the seating area, the angle and vertical displacement at the forward end of the guiderail should be sufficient to resist pulling the net assembly rearwardly, and preferably at least about 2 cm.

In one embodiment, an operator may open occupant side retention system 102 at the single releasable front attachment point. The operator may unlock the buckle or latch 150 at top front attachment point 140, and allow the net assembly to slide and/or collapse along the guiderail toward the rear of the vehicle and out of the occupant opening and footpath.

In a second embodiment shown in FIG. 3, utility vehicle 200 may include a front seating area and a rear seating area. Occupant side retention system 202 is provided for the front seating area, and occupant side retention system 203 is provided for the rear seating area. Occupant side retention system 202 includes net assembly 238 with a lower edge 236 that slides fore and aft, and vertically, along guiderail 204 between an open position and a closed position. The lower edge of net assembly 238 may slide forwardly and vertically to the front end of the guiderail, allowing the net assembly to be bucked or latched in the closed position at a single releasable attachment point 240. Occupant side retention system 203 includes net assembly 239 with a lower edge 237 that slides fore and aft, and vertically, along guiderail 205 between an open position and a closed position. The lower edge of net assembly 239 may slide forwardly and vertically to the front end of the guiderail, allowing the net assembly to be bucked or latched in the closed position at a single releasable attachment point 250.

In a second embodiment, each occupant side retention system 202, 203 may include guiderail 204, 205 fastened rigidly to the side or outer edge of lower frame member 219 at or adjacent the floor of the utility vehicle's front and rear seating areas respectively, and generally forwardly of the front and rear vehicle seats 252, 253. Each guiderail may be steel, aluminum or another metal or alloy, or high strength plastic material, with a diameter of less than about 2 cm, and a length of less than about 1 meter. In the embodiment of FIG. 3, each guiderail may have a forward end fastened rigidly to the lower frame member adjacent the front of each seating area, and a rearward end fastened rigidly to the lower frame member adjacent the front of vehicle seat 252 or 253. The forward ends 212, 213 of guiderails 204, 205 may have vertical peaks where part of the lower edge of each net assembly slides to in the closed position. The vertical peaks may be at least about 2 cm vertically higher than lower portions of the guiderails, including the rearward ends 217, 218 of each guiderail. Each guiderail may have a generally horizontal portion adjacent the rearward end, and then slope upwardly toward the first end, and then slope upwardly more steeply at the forward ends. The forward ends 212, 213 of each guiderail may have a vertical peak where part of the lower edge of the net assembly slides to in the closed position. The slope or ramp can start at any point along each guiderail, or at any location within the fore-and-aft dimension of the seating area.

In a second embodiment, each occupant side retention system 202, 203 may include a net assembly 238, 239 having lower edges 236, 237, and at least part of the lower edges slide fore and aft, and to the vertical peaks, along guiderails 204, 205. The lower edges of each net assembly may slide along the guiderails by various retaining and sliding mechanisms. For example, each net assembly may have one or more rings, such as forward ring 260, 261 secured to the front lower corner of the net assembly. The rear lower corner of each net assembly may be fixed and secured in place to rearward ends 217, 218 of each guiderail. The lower or bottom edges 236, 237 of each net assembly may have substantially the same length as the dimension between the forward ends 212, 213 and rearward ends 217, 218 of each guiderail. The operator may close each net assembly by sliding it forwardly, urging the lower or bottom edges 236, 237 forwardly until part of the lower bottom edges, and preferably the front lower corners, reaches the forward ends 212, 213 of the respective guiderail. Other components or mechanisms may be used to slide the net assemblies along the guiderails, such as followers that engage slots in the guiderail instead of rings, if the components allow the lower or bottom edge of each net assembly to slide freely along the guiderail and follow the guiderail profile.

In a second embodiment, rear edges 247, 248 of each net assembly 238, 239 may be fastened to roll over protection structure 208 of utility vehicle 200 at one or more rear attachment points 242-245. The rear attachment points for the rear edge of each net assembly may include clamps fastened to upright 209, 210 of the roll over protection structure adjacent seats 252, 253. One of the rear attachment points, for the top rear corner of each net assembly, may be located on roll over protection structure uprights 209, 210 at or above the top of each seat back. Alternatively, one or more of the rear attachment points may be fastened to other structures on the utility vehicle adjacent the seats and seat backs.

In a second embodiment, front edges 232, 233 of each net assembly 238, 239 may be removably and releasably buckled or latched to uprights 206, 209 of the roll over protection structure at single front attachment points 240, 242. Each of the single front attachment points for the front edges of the net assembly may be a clamp fastened to upright 206, 209 of the roll over protection structure. Each net assembly may include a buckle or latch 249, 250 that an operator can manually release, engage and disengage from front attachment point 240, 242. Each single front attachment point 240, 242 may be used to open and close the occupant side retention system by buckling or latching the front edge of the net assembly to the roll over protection structure. Alternatively, each single front attachment point may be used to releasably and removably buckle or latch a part of the front edge of each net assembly to another structure of the utility vehicle adjacent the front of either thro front or back seating area.

In a second embodiment, each net assembly's front edge 232, 233 may have substantially the same length as the dimension between the forward end 212, 213 of each guiderail and each front attachment point 240, 242. The front edge 232, 233 of each net assembly may be pulled to substantially its full length when each forward ring 260, 261 reaches the vertical peaks at the forward ends 212, 213 of each guiderail, so that each buckle 249, 250 can be engaged to clamp 240 or 242. Additionally, each net assembly's top edge 230, 231 may have substantially the same length as the dimension between each rear attachment point 242, 243 and each front attachment point 240, 242. Top edges 230, 231 of each net assembly also may be pulled to its full length so that buckles or latches 249, 250 can be engaged to clamps 240, 242. Additionally, each net assembly may have diagonals 273-276 between the edges, which may be pulled to their full length when each buckle 249, 250 is engaged to clamp 240, 242. The edges of each net assembly and diagonals also may be reinforced with high strength material or high tension straps. Additionally, one or more of the edges and/or straps may include adjustment members that may be used to adjust their lengths.

In the second embodiment, an operator may move occupant side retention system 202 or 203 from the open position to the closed position by urging net assembly 238 or 239 in a forward direction, causing bottom or lower edge 236 or 237 of the net assembly to follow guiderail 204 or 205 forwardly and up the vertical peak at the forward end sufficiently so the operator can lock buckle or latch 249 or 250 to top front attachment point 240 or 242. In the closed position, each net assembly may cover the occupant opening alongside the seating area, limiting the occupant's feet, arms and torso to within an offset plane of the vehicle. To prevent the bottom or lower edge of the net from opening unintentionally from the outside or inside of the seating area, the angle and vertical displacement at the forward end of each guiderail should be sufficient to resist pulling the net assembly rearwardly, and preferably at least about 2 cm.

In the second embodiment, an operator may open each occupant side retention system 202, 203 at a single releasable front attachment point. The operator may unlock the buckle or latch 249 or 250 at top front attachment point 240 or 242, and allow the net assembly to slide and/or collapse along the guiderail toward the rear of the vehicle and out of the occupant opening and footpath.

Having described the preferred embodiment, it will become apparent that various modifications can be made without departing from the scope of the invention as defined in the accompanying claims.

The invention claimed is:

1. A utility vehicle occupant side retention system, comprising:
    a guiderail fastened rigidly to a side of the utility vehicle with a vertical peak at a forward end of the guiderail; and
    a net assembly having a lower edge slideably engaged to the guiderail, a rear edge fastened to at least one rear attachment point on the utility vehicle, and a front edge releasably fastened to a front attachment point on the utility vehicle when the lower edge is at the forward end of the guiderail.

2. The utility vehicle occupant side retention system of claim 1 wherein the front attachment point and rear attachment points are on a roll over protection system of the utility vehicle.

3. The utility vehicle occupant side retention system of claim 1 wherein the guiderail has an upwardly sloping ramp toward the vertical peak of the guiderail.

4. The utility vehicle occupant side retention system of claim 1 wherein the net assembly is slideably engaged to the guiderail by a plurality of rings.

5. The utility vehicle occupant side retention system of claim 1 wherein the single front attachment point comprises a buckle.

6. The utility vehicle occupant side retention system of claim 1 wherein the guiderail is located forwardly of a seat of the utility vehicle.

7. The utility vehicle occupant side retention system of claim 1 wherein the front attachment point is the only releasable attachment point of the net assembly.

8. A utility vehicle occupant side retention system comprising:
    a guiderail having a forward end attached to a lower frame member of the utility vehicle and a rearward end attached to the lower frame member of the utility vehicle, the forward end being the highest vertical position of the guiderail;
    a net assembly having a lower edge sliding along the guiderail between an open position and a closed position; a part of lower edge of the net assembly being at the forward end of the guiderail in the closed position, and a part of the lower edge of the net assembly being at a rearward end of the guiderail in the open position; and
    a single releasable front attachment point on the utility vehicle engageable by a forward edge of the net assembly only if a part of the lower edge of the net assembly is at the forward end of the guiderail.

9. The utility vehicle occupant side retention system of claim 8 wherein the lower edge of the net assembly includes at least one ring that slides along the guiderail.

10. The utility vehicle occupant side retention system of claim 8 further comprising a plurality of rear attachment points on the utility vehicle that are engaged by a rearward edge of the net assembly.

11. The utility vehicle occupant side retention system of claim 8 wherein the single releasable front attachment point is on an upright of a roll over protection structure and is engageable by a buckle.

12. The utility vehicle occupant side retention system of claim 8 wherein the net assembly includes reinforcing straps around its edges and on diagonals between the edges.

13. The utility vehicle occupant side retention system of claim 8 wherein the guiderail is sloped upwardly from a center to the forward end.

14. A utility vehicle occupant side retention system comprising:
a net assembly having a lower edge sliding along a guiderail secured to the utility vehicle, a rear edge attached to at least one rear attachment point on a roll over protection structure of the utility vehicle, and a front edge releasably attachable to a front attachment point on the roll over protection structure;
the guiderail being sloped sufficiently to a vertical peak so the front edge of the net assembly may be releasably attached to the front attachment point on the rollover protection structure only if a part of the lower edge slides forwardly and upwardly to a forward end of the guiderail.

15. The utility vehicle occupant side retention system of claim 14 wherein the guiderail is sloped vertically up toward the forward end.

16. The utility vehicle occupant side retention system of claim 14 wherein the guiderail is substantially forwardly of a seating area of the utility vehicle.

17. The utility vehicle occupant side retention system of claim 14 wherein the front edge of the net assembly may be releasably attached to the front attachment point with a buckle.

18. The utility vehicle occupant side retention system of claim 14 wherein the front attachment point is the only releasable attachment point of the utility vehicle for the net assembly.

19. The utility vehicle occupant side retention system of claim 14 further comprising a guiderail and net assembly on each side of a front row of seats, and a guiderail and net assembly on each side of a rear row of seats.

* * * * *